No. 689,564. Patented Dec. 24, 1901.
G. PARTILLO.
WRENCH.
(Application filed Apr. 4, 1901.)
(No Model.)
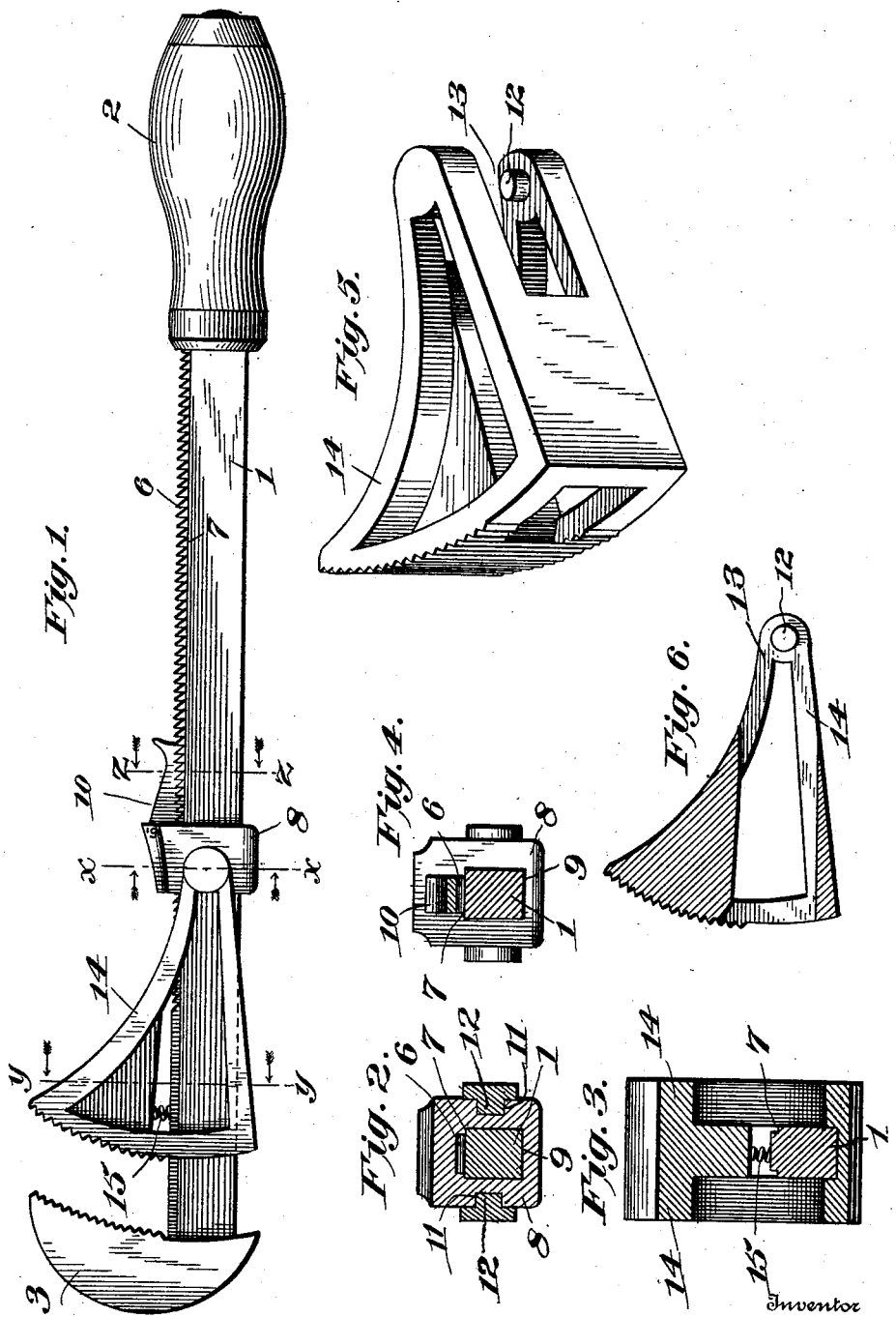
Witnesses
Elmer Seavey
J. W. Wilson
Inventor
George Partillo.
By H. B. Willson & Co
Attorneys

UNITED STATES PATENT OFFICE.

GEORGE PARTILLO, OF SARNIA, CANADA.

WRENCH.

SPECIFICATION forming part of Letters Patent No. 689,564, dated December 24, 1901.

Application filed April 4, 1901. Serial No. 54,313. (No model.)

*To all whom it may concern:*

Be it known that I, GEORGE PARTILLO, a citizen of the United States, residing at Sarnia, in the Province of Ontario and Dominion of Canada, have invented certain new and useful Improvements in Wrenches; and I do declare the following to be a full, clear, and exact description of the invention, such as will enable others skilled in the art to which it appertains to make and use the same.

The invention relates to wrenches.

The object of the invention is to provide a wrench which shall be simple of construction, durable in use, comparatively inexpensive of production, rapid of adjustment, and efficient in action.

With this and other objects in view the invention consists of certain novel features of construction, combination, and arrangement of parts, which will be hereinafter more fully described, and particularly pointed out in the appended claim.

In the accompanying drawings, Figure 1 is a side elevation of a complete wrench. Fig. 2 is a sectional view on line $x$ $x$ of Fig. 1. Fig. 3 is a similar view on line $y$ $y$ of Fig. 1. Fig. 4 is a similar view on line $z$ $z$ of Fig. 1. Fig. 5 is a detail perspective view of the pivoted jaw of the wrench, and Fig. 6 is a longitudinal sectional view through the pivoted jaw.

Referring to the drawings, 1 denotes the shank of the wrench, 2 the handle, and 3 the rigid jaw secured to the outer end of the shank. This jaw has its inner or working face roughened or provided with teeth and slightly curved. The upper edge of the shank is provided with ratchet-teeth 6, which project upwardly in a plane above the smooth parallel marginal edges 7 of the shank.

8 denotes a collar having an aperture 9, corresponding in shape to the cross-sectional area of the shank and provided with a pivoted dog 10, which is adapted to engage said teeth and hold the collar in adjusted position. The outer sides of the collar are provided with sockets or recesses 11 to receive trunnions 12, formed at the bifurcated end 13 of the pivoted jaw, which is mounted to slide upon the shank 1 and is of skeleton form and is provided with a strengthening-web 14, between which and the upper smooth edge of the shank is interposed a coiled spring 15, the energy of which is exerted to hold the jaw in the position shown in Fig. 1 of the drawings. The working face of the jaw is serrated or provided with teeth, as shown.

The wrench in use, when applied to a pipe, is operated like an ordinary ratchet-wrench, but performs its work in a noiseless manner and more efficiently. It may be quickly adjusted and when adjusted automatically locks itself in position, as the dog 10 is free to move outwardly and automatically locks the jaw 13 against inward movement along the shank 1.

From the foregoing description, taken in connection with the accompanying drawings, the construction, mode of operation, and advantages of my invention will be readily understood without requiring a more extended explanation.

Various changes in the form, proportion, and minor details of construction may be made within the scope of the invention without departing from the spirit or sacrificing any of the advantages thereof.

Having thus described my invention, what I claim, and desire to secure by Letters Patent, is—

A wrench comprising a shank having a fixed jaw at one end, a collar mounted to slide upon said shank and provided with means for locking it in adjusted position thereon, said collar being formed with sockets or recesses in its side, a jaw having a bifurcated end formed with trunnions adapted to be sprung into said sockets or recesses, and a spring interposed between said shank and jaw for normally holding the pivoted jaw in elevated position, substantially as set forth.

In testimony whereof I have hereunto set my hand in presence of two subscribing witnesses.

GEORGE PARTILLO.

Witnesses:
H. D. KILETS,
E. A. BARTLETT.